US012733054B2

(12) United States Patent
Zhou et al.

(10) Patent No.: US 12,733,054 B2
(45) Date of Patent: Sep. 8, 2026

(54) METHODS AND APPARATUSES FOR SAME EVENT SUBSCRIPTION FOR MULTI SESSIONS OF ONE UE

(71) Applicant: Telefonaktiebolaget LM Ericsson (publ), Stockholm (SE)

(72) Inventors: Zongming Zhou, Shanghai (CN); Yunjie Lu, Shanghai (CN); Yingjiao He, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 223 days.

(21) Appl. No.: 18/704,140

(22) PCT Filed: Aug. 16, 2022

(86) PCT No.: PCT/CN2022/112784

§ 371 (c)(1),
(2) Date: Apr. 24, 2024

(87) PCT Pub. No.: WO2023/077907

PCT Pub. Date: May 11, 2023

(65) Prior Publication Data

US 2024/0414794 A1 Dec. 12, 2024

(30) Foreign Application Priority Data

Nov. 4, 2021 (WO) ................ PCT/CN2021/128798

(51) Int. Cl.

*H04W 76/15* (2018.01)
*H04L 67/142* (2022.01)
*H04L 67/55* (2022.01)

(52) U.S. Cl.

CPC ........... *H04W 76/15* (2018.02); *H04L 67/142* (2013.01); *H04L 67/55* (2022.05)

(58) Field of Classification Search

CPC .... H04W 76/15; H04W 88/14; H04L 67/142; H04L 67/55; H04L 67/14

See application file for complete search history.

(56) References Cited

U.S. PATENT DOCUMENTS 11,224,093 B2 * 1/2022 Bharatia ............... H04W 80/10
12,490,077 B2 * 12/2025 Chen ..................... H04W 76/22

(Continued)

FOREIGN PATENT DOCUMENTS

KR 20200116845 A 10/2020
WO WO-2024005396 A1 * 1/2024 ............ H04W 24/08

OTHER PUBLICATIONS

Vivo, et al., "S2-2106625: Miscellaneous correction for TS 23.88," 3GPP TSG-SA2 Meeting #146-e, Aug. 16-27, 2021, Electronic Meeting, 62 pages.

(Continued)

*Primary Examiner* — Ivan O Latorre
(74) *Attorney, Agent, or Firm* — Withrow & Terranova, PLLC

(57) ABSTRACT

The present disclosure proposes a method performed by method for a first NF implementing a consumer of an Event Exposure service provided by a second NF implementing a producer of the Event Exposure service, including: receiving a trigger for subscribing an event for a PDU session of a UE; allocating an event ID specific to the UE for the event, and sending a first request for subscribing the event to the second NF, if the event has not been allocated the event ID, wherein the first request includes the event ID; and saving mapping between the event ID and the ID of the PDU session. By this method, the waste of resources for the first NF and the second NF can be reduced, for example, the message interaction and the traffic between the two NFs are reduced, and the CPU resources are saved on each of the two NFs.

14 Claims, 5 Drawing Sheets

(56) References Cited

U.S. PATENT DOCUMENTS

| | | | | |
|---|---|---|---|---|
| 2019/0261260 | A1* | 8/2019 | Dao | H04W 8/20 |
| 2020/0007632 | A1* | 1/2020 | Landais | H04L 67/02 |
| 2020/0358689 | A1* | 11/2020 | Lee | H04L 43/0817 |
| 2021/0219357 | A1* | 7/2021 | Talebi Fard | H04L 47/28 |
| 2021/0274392 | A1 | 9/2021 | Dao et al. | |
| 2021/0281658 | A1* | 9/2021 | Kweon | H04L 67/30 |
| 2022/0248273 | A1* | 8/2022 | Sama | H04W 36/12 |
| 2022/0272619 | A1* | 8/2022 | Garcia Azorero | H04W 8/186 |
| 2023/0337322 | A1* | 10/2023 | Talebi Fard | H04W 4/90 |
| 2024/0121309 | A1* | 4/2024 | Muñoz De La Torre | H04L 69/14 |
| 2024/0236638 | A1* | 7/2024 | So | H04W 12/06 |
| 2024/0414794 | A1* | 12/2024 | Zhou | H04W 76/15 |

OTHER PUBLICATIONS

Notice of Reasons for Refusal for Japanese Patent Application No. 2025-048994, mailed Feb. 16, 2026, 6 pages.

Author Unknown, "Technical Specification Group Core Network and Terminals; Non-Access-Stratum (NAS) protocol for 5G System (5GS); Stage 3 (Release 17)," Technical Specification 24.501, Version 17.0.0, Sep. 2020, 3GPP Organizational Partners, 728 pages.

Author Unknown, "Technical Specification Group Core Network and Terminals; 5G System; Technical Realization of Service Based Architecture; Stage 3 (Release 17)," Technical Specification 29.500, Version 17.4.0, Sep. 2021, 3GPP Organizational Partners, 109 pages.

Author Unknown, "Technical Specification Group Core Network and Terminals; 5G System; Access and Mobility Management Services; Stage 3 (Release 17)," Technical Specification 29.518, Version 17.3.0, Sep. 2021, 3GPP Organizational Partners, 335 pages.

Author Unknown, "Technical Specification Group Core Network and Terminals; 5G System; Common Data Types for Service Based Interfaces; Stage 3 (Release 17)," Technical Specification 29.571, Version 17.2.0, Jun. 2021, 3GPP Organizational Partner, 155 pages.

International Search Report and Written Opinion for International Patent Application No. PCT/CN2022/112784, mailed Nov. 24, 2022, 8 pages.

International Preliminary Report on Patentability for International Patent Application No. Jan. 29, 2024, 6 pages.

Examination Report for European Patent Application No. 22773100.7, mailed Jul. 15, 2025, 4 pages.

* cited by examiner

METHODS AND APPARATUSES FOR SAME EVENT SUBSCRIPTION FOR MULTI SESSIONS OF ONE UE

This application is a 35 U.S.C. § 371 national phase filing of International Application No. PCT/CN2022/112784, filed Aug. 16, 2022, which claims the benefit of International Application No. PCT/CN2021/128798, filed Nov. 4, 2021, the disclosures of which are incorporated herein by reference in their entireties.

TECHNICAL FIELD

The non-limiting and example embodiments of the present disclosure generally relate to the technical field of mobile communication network, and specifically to methods and apparatuses for same event subscription for multi sessions of one User Equipment (UE).

BACKGROUND

This section introduces aspects that may facilitate a better understanding of the disclosure. Accordingly, the statements of this section are to be read in this light and are not to be understood as admissions about what is in the prior art or what is not in the prior art.

A Network Function (NF) in a mobile communication network may offer an event exposure service as a producer of the service to enable another NF as a consumer of the service to subscribe event notifications and get notified about an event. For example, an Access and Mobility Management Function (AMF) in a 5G network as a producer may provide such a service to another NF as a consumer, such as Session Management Function (SMF), Unified Data Management (UDM) or the like.

The event exposure service may include three basic operations: a Subscribe operation, a Notify operation, and an Unsubscribe operation. As an example, we take an AMF in a 5G network as a producer of the event exposure service and another NF as a consumer of the event exposure service in the 5G network to introduce the three basic operations in the following.

I. Subscribe Operation

The Subscribe operation is invoked by a NF Service Consumer towards the AMF, when it needs to create a subscription to monitor at least one event relevant to the AMF. The NF Service Consumer may subscribe multiple events in a subscription. A subscription may be associated with one UE, a group of UEs or any UE. The NF Service Consumer shall request to create a new subscription by using HTTP method POST with URI of the subscriptions collection.

An example of the Subscribe operation between the NF Service Consumer and the AMF is shown in the FIG. 1.

At step 1 in FIG. 1, the NF Service Consumer (101) shall send a POST request to create a subscription resource in the AMF (102). The payload body of the POST request shall contain a representation of the individual subscription resource to be created. The request may contain an expiry time, suggested by the NF Service Consumer (101) as a hint, representing the time upto which the subscription is desired to be kept active and the time after which the subscribed event(s) shall stop generating report.

At step 2*a* in FIG. 1, on success, the request is accepted, the AMF (102) shall include a HTTP Location header to provide the location of a newly created resource (subscription) together with the status code 201 indicating the requested resource is created in the response message. If the NF Service Consumer (101) has included more than one events in the event subscription and some of the events are failed to be subscribed, the AMF (102) shall accept the message and provide the successfully subscribed event(s) in AmfEventSubscription.

At step 2*b* in FIG. 1, on failure or redirection, one of the HTTP status codes shall be returned. For a 4xx/5xx response, the message body shall contain a ProblemDetails structure with the "cause" attribute set to one of the application errors.

II. Notify Operation

The Notify service operation is invoked by the AMF, to send a notification, towards the notification URI, when certain event included in the subscription has taken place. The AMF shall use the HTTP method POST, using the notification URI received in the subscription creation, including e.g. the subscription ID, Event ID(s) for which event has happened, notification correlation ID provided by the NF service consumer at the time of event subscription, to send a notification.

An example of the Notify operation between the NF Service Consumer and the AMF is shown in the FIG. 2.

At step 1 in FIG. 2, the AMF (202) shall send a POST request to send a notification.

At step 2*a* in FIG. 2, on success, "204 No content" shall be returned by the NF Service Consumer (201).

At step 2*b* in FIG. 2, on failure or redirection, the appropriate HTTP status code (e.g. "403 Forbidden") indicating the error shall be returned and appropriate additional error information should be returned.

III. Unsubscribe Operation

The Unsubscribe service operation is invoked by a NF Service Consumer towards the AMF, to remove an existing subscription previously created by itself at the AMF. The NF Service Consumer shall unsubscribe the subscription by using HTTP method DELETE with the URI of the individual subscription resource to be deleted.

An example of the Notify operation between the NF Service Consumer and the AMF is shown in the FIG. 3.

At step 1 in FIG. 3, the NF Service Consumer (301) shall send a DELETE request to delete an existing subscription resource in the AMF (302).

At step 2*a* in FIG. 3, on success, the request is accepted, the AMF (302) shall reply with the status code 204 indicating the resource identified by subscription ID is successfully deleted in the response message.

At step 2*b* in FIG. 3, on failure or redirection, one of the HTTP status codes shall be returned. For a 4xx/5xx response, the message body shall contain a ProblemDetails structure with the "cause" attribute set to one of the application errors.

In addition to providing the event exposure service, the AMF also may initiate synchronization for event subscriptions with the UDM for the specific UE during Evolved Packet System (EPS) to 5th generation system (5GS) mobility registration procedure, if UE specific event subscriptions from the UDM are available in UE Context, when the AMF and the UDM both support the "ESSYNC" feature, as specified in 3GPP Technical Specification (TS) 29.518.

To initiate event subscription synchronization, when sending notification for subscription change to the UDM, the AMF shall include the event subscription information in the notification request. If subscription change notification is not needed, e.g. when UE registers to the same AMF after moving from Evolved Packet System (EPS), the AMF may send a notification to the subscription change notification URI. The notification request in this case only includes the event subscription information but no event report list.

The AMF shall only include active event subscriptions for the specific UE from UDM Event Exposure service, i.e. the subscriptions targeting specifically the UE (not a group of UEs or any UE) and each subscribed event with a Reference Id (i.e., a "refId" field, which is defined in "Table 6.2.6.2.3-1: Definition of type AmfEvent" in TS 29.518), in the event subscription information. For each active subscription, the following information shall include:

URI of the subscription resource in the AMF; and

Notification Correlation Id of the subscription; and list of Reference Ids, one per event in the subscription; and optionally, the URI of old subscription resource on the source AMF, if the subscription Id is changed during the mobility procedure.

When the UDM receives event subscription information from AMF, the UDM shall compare the active event subscriptions in AMF with the active UDM Event Exposure subscriptions using Reference Id(s) and Notification Correlation Id, and perform the following:

if an event is to be detected by AMF but not existing in the AMF, the UDM shall subscribe the event in AMF by creating a new AMF event subscription or updating an existing AMF event subscription;

if an event exists in AMF but does not exist in UDM, the UDM shall unsubscribe the event from AMF by removing or update an AMF event subscription.

According to the latest version of TS 29.518, although Reference Id(s) are designed specifically for Event Monitoring Subscriptions from UDM, it cannot preclude that other NFs may use it for internal AMF event subscriptions.

SUMMARY

Sometimes, an event should be subscribed for a PDU session of a UE. Therefore, a first NF acting as a consumer of the event exposure service in a mobile communication network may send a request for subscribing an event for a PDU session of the UE, to a second NF acting as a producer of the event exposure service. The request for subscribing an event for the PDU session may be triggered by the first NF itself or by another NF, according to the traffic requirements, the operator's requirements and/or other requirements specified by the technical specifications of the mobile communication network.

However, the inventors of the present disclosure find, when the first NF wants to subscribe a same event for multiple PDU sessions of the same UE, the following problem exists:

The first NF acting as the consumer will send a request for subscribing the same event for each of the multiple PDU sessions of the UE to the second NF acting as the producer, i.e., multiple requests will be sent from the first NF to the second NF, and the second NF will send multiple reports of the same event to the first NF if the event occurs, which cause e.g. waste of resources.

For example, in a SMF managing PDU sessions in a 5G network, one UE may have M PDU sessions. If the SMF wants to subscribe a same event for the M PDU sessions of the UE from an AMF in the 5G network, the SMF will send M requests to the AMF, and the AMF will send M reports of the same event to the SMF, leading to:

(1) higher message interaction between the SMF and the AMF;

(2) higher traffic load between AMF and SMF;

(3) more CPU resources spent on the AMF for generating and sending reports of the same event;

(4) more CPU resources spent on the SMF for receiving and handling the reports of the same event.

One of the objects of the present disclosure is to resolve or alleviate the above problem.

According to a first aspect of the present disclosure, the object is achieved by a method for a first Network Function (NF) implementing a consumer of an Event Exposure service provided by a second NF implementing a producer of the Event Exposure service, including: receiving a trigger for subscribing an event for a Protocol Data Unit (PDU) session of a User Equipment (UE); allocating an event identifier (ID) specific to the UE for the event, and sending a first request for subscribing the event to the second NF, if the event has not been allocated the event ID, wherein the first request includes the event ID; and saving mapping between the event ID and the ID of the PDU session.

According to a second aspect of the present disclosure, the object is achieved by a first Network Function (NF) implementing a consumer of an Event Exposure service provided by a second NF implementing a producer of the Event Exposure service, the first NF including: a receiving unit, for receiving a trigger for subscribing an event for a Protocol Data Unit (PDU) session of a User Equipment (UE); an allocating and sending unit, for allocating an event identifier (ID) specific to the UE for the event, and sending a first request for subscribing the event to the second NF, if the event has not been allocated the event ID, wherein the first request includes the event ID; and a saving unit, for saving mapping between the event ID and the ID of the PDU session.

According to a third aspect of the present disclosure, the object is achieved by a first Network Function (NF) implementing a consumer of an Event Exposure service provided by a second NF implementing a producer of the Event Exposure service, the first NF including: a processor; and a memory, having stored instructions that when executed by the processor cause the first NF to: receive a trigger for subscribing an event for a Protocol Data Unit (PDU) session of a User Equipment (UE); allocate an event identifier (ID) specific to the UE for the event, and send a first request for subscribing the event to the second NF, if the event has not been allocated the event ID, wherein the first request includes the event ID; and save mapping between the event ID and the ID of the PDU session.

According to a fourth aspect of the present disclosure, the object is achieved by a machine readable medium having stored thereon instructions that when executed on a first NF cause the first NF to perform the method according to the first aspect.

According to a fifth aspect of the present disclosure, the object is achieved by a method for a second Network Function (NF) implementing a producer providing an Event Exposure service to a first NF implementing a consumer of the Event Exposure service, including: receiving a request for subscribing an event from the first NF, wherein the request includes an event ID of the event; saving the event ID; and sending a report for the event to the first NF, if the event occurs, wherein the report includes the event ID.

According to a sixth aspect of the present disclosure, the object is achieved by a second Network Function (NF) implementing a producer providing an Event Exposure service to a first NF implementing a consumer of the Event Exposure service, the second NF including: a receiving unit, for receiving a request for subscribing an event from the first NF, wherein the request includes an event ID of the event;

a saving unit, for saving the event ID; and a sending unit, for sending a report for the event to the first NF, if the event occurs, wherein the report includes the event ID.

According to a seventh aspect of the present disclosure, the object is achieved by a second Network Function (NF) implementing a producer providing an Event Exposure service to a first NF implementing a consumer of the Event Exposure service, including: a processor; and a memory, having stored instructions that when executed by the processor cause the second NF to: receive a request for subscribing an event from the first NF, wherein the request includes an event ID of the event; save the event ID; and send a report for the event to the first NF, if the event occurs, wherein the report includes the event ID.

According to an eighth aspect of the present disclosure, the object is achieved by a machine readable medium having stored thereon instructions that when executed on a second NF cause the second NF to perform the method according to the fifth aspect.

According to a ninth aspect of the present disclosure, the present disclosure also provides a method for a second Network Function (NF) implementing a producer providing an Event Exposure service to a first NF implementing a consumer of the Event Exposure service, including: receiving a request for subscribing an event from the first NF; sending a report for the event to the first NF, if the event occurs; and notifying a third NF of subscription information of the event, if the third NF will act as a new producer providing the Event Exposure service, wherein the first NF is a Session Management Function (SMF) or a first UDM, the second NF is an Access and Mobility Management Function (AMF), and the third NF is another AMF, the subscription information further includes an indicator to indicate whether said another AMF needs to synchronize the subscription of the event with a second UDM, if said another AMF and the second UDM both support the "ESSYNC" feature, wherein the second UDM is the first UDM or another UDM.

According to a tenth aspect of the present disclosure, the present disclosure also provides a second Network Function (NF) implementing a producer providing an Event Exposure service to a first NF implementing a consumer of the Event Exposure service, including: a receiving unit, for receiving a request for subscribing an event from the first NF; a sending unit, for sending a report for the event to the first NF, if the event occurs; and a notifying unit, for notifying a third NF of subscription information of the event, if the third NF will act as a new producer providing the Event Exposure service, wherein the first NF is a Session Management Function (SMF) or a first UDM, the second NF is an Access and Mobility Management Function (AMF), and the third NF is another AMF, the subscription information further includes an indicator to indicate whether said another AMF needs to synchronize the subscription of the event with a second UDM, if said another AMF and the second UDM both support the "ESSYNC" feature, wherein the second UDM is the first UDM or another UDM.

According to an eleventh aspect of the present disclosure, the present disclosure also provides a second Network Function (NF) implementing a producer providing an Event Exposure service to a first NF implementing a consumer of the Event Exposure service, including: a processor; and a memory, having stored instructions that when executed by the processor cause the second NF to: receive a request for subscribing an event from the first NF; send a report for the event to the first NF, if the event occurs; and notify a third NF of subscription information of the event, if the third NF will act as a new producer providing the Event Exposure service, wherein the first NF is a Session Management Function (SMF) or a first UDM, the second NF is an Access and Mobility Management Function (AMF), and the third NF is another AMF, the subscription information further includes an indicator to indicate whether said another AMF needs to synchronize the subscription of the event with a second UDM, if said another AMF and the second UDM both support the "ESSYNC" feature, wherein the second UDM is the first UDM or another UDM.

According to an twelfth aspect of the present disclosure, the present disclosure also provides a machine readable medium having stored thereon instructions that when executed on a second NF cause the second NF to perform the method according to the ninth aspect By this invention, when a same event needs to be subscribed for multiple sessions, the first NF only sends one request, and the second NF only sends one report of the event if the event occurs, thus reducing waste of resources, for example, the message interaction and the traffic between the two NFs are reduced, and the CPU resources are saved on each of the two NFs.

BRIEF DESCRIPTION OF THE DRAWINGS

The above and other aspects, features, and benefits of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., herein to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Figure 4:
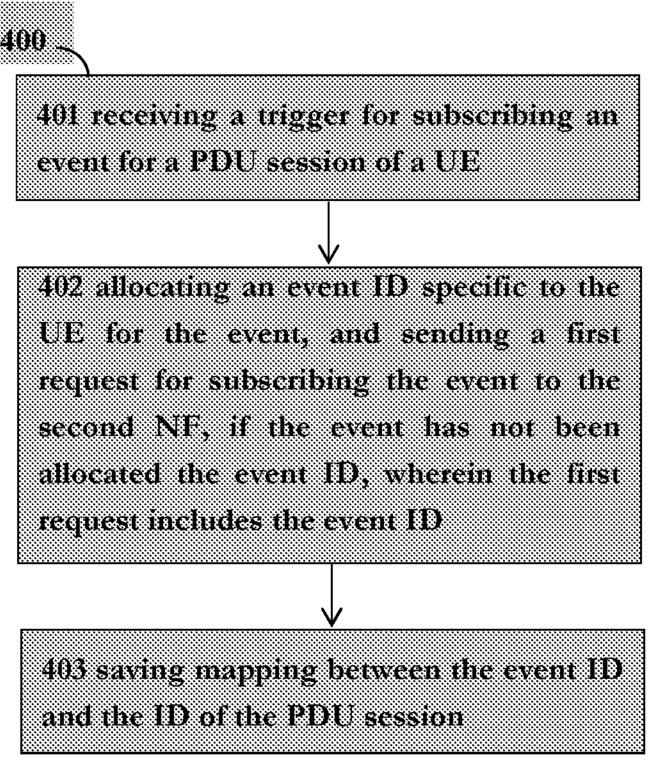
FIG. 4 illustrates a flowchart of the method for a first NF implementing a consumer of an Event Exposure service according to the present disclosure.
Figure 5:
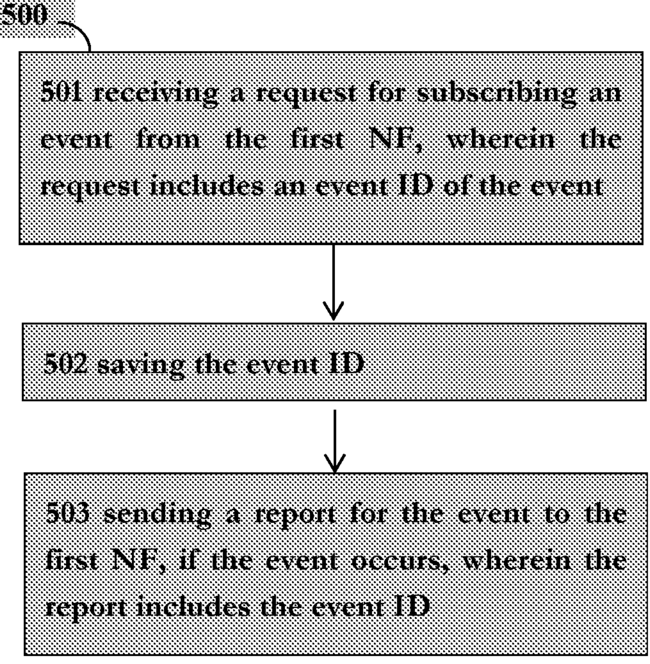
FIG. 5 illustrates a flowchart of the method for a second NF implementing a producer providing an Event Exposure service according to the present disclosure.

A flowchart of a method for a first NF implementing a consumer of an Event Exposure service provided by a second NF implementing a producer of the Event Exposure service is shown in FIG. 4. The method 400 includes the following steps: a step 401 of receiving a trigger for subscribing an event for a PDU session of a UE; a step 402 of allocating an event ID specific to the UE for the event, and sending a first request for subscribing the event to the second NF, if the event has not been allocated the event ID, wherein the first request includes the event ID; and a step 403 of saving mapping between the event ID and the ID of the PDU session.

In an embodiment, the method 400 further includes: receiving a report for the event from the second NF, wherein the report includes the event ID; forwarding the report to one or more PDU sessions of the UE subscribing the event according to mapping between the event ID and the ID(s) of the one or more PDU sessions.

In an embodiment, the method 400 further includes: receiving a trigger for unsubscribing the event for a PDU session of the UE; removing mapping between the event ID and the ID of the PDU session for which the event is unsubscribed; and deleting the event ID and sending a second request for unsubscribing the event to the second NF, if there is no mapping between the event ID and an ID of a PDU session in the first NF.

In an embodiment, the mapping is saved in a mapping table in the first NF.

In an embodiment, the first NF is a SMF or a UDM, and the second NF is an AMF.

In a further embodiment, the first request is a Namf_EventExposure_Subscribe request, the report is carried in a Namf_EventExposure_Notify request, and the second request is a Namf_EventExposure_UnSubscribe request.

In a further embodiment, the event ID is carried in the existing "refId" field or a newly defined field in the Namf_EventExposure_Subscribe request and in the report.

A flowchart of a method 500 for a second NF implementing a producer providing an Event Exposure service to a first NF implementing a consumer of the Event Exposure service, including: a step 501 of receiving a request for subscribing an event from the first NF, wherein the request includes an event ID of the event; a step 502 of saving the event ID; and a step 503 of sending a report for the event to the first NF, if the event occurs, wherein the report includes the event ID.

In an embodiment, the method 500 further includes: notifying a third NF of subscription information of the event which includes the event ID, if the third NF will act as a new producer providing the Event Exposure service.

In an embodiment, the first NF is a SMF or a first UDM, and the second NF is an AMF.

In a further embodiment, the request is a Namf_EventExposure_Subscribe request, and the report is carried in a Namf_EventExposure_Notify request.

In a further embodiment, the event ID is carried in the existing "refId" field or a newly defined field in the Namf_EventExposure_Subscribe request and in the report.

In a further embodiment, the third NF is another AMF, and the subscription information includes the event ID in the existing "refId" field.

In a further embodiment, the subscription information further includes an indicator to indicate the subscription of the event does not need to be synchronized with a second Unified Data Management (UDM), if said another AMF and the second UDM both support the "ESSYNC" feature, wherein the second UDM may be the first UDM or not.

Both the first NF and the second NF can be implemented as a network element on a dedicated hardware, as a software instance or a firmware running on a hardware, as a virtualized function instantiated on an appropriate platform (e.g. on a cloud infrastructure), or as any combination thereof.

Figure 6:
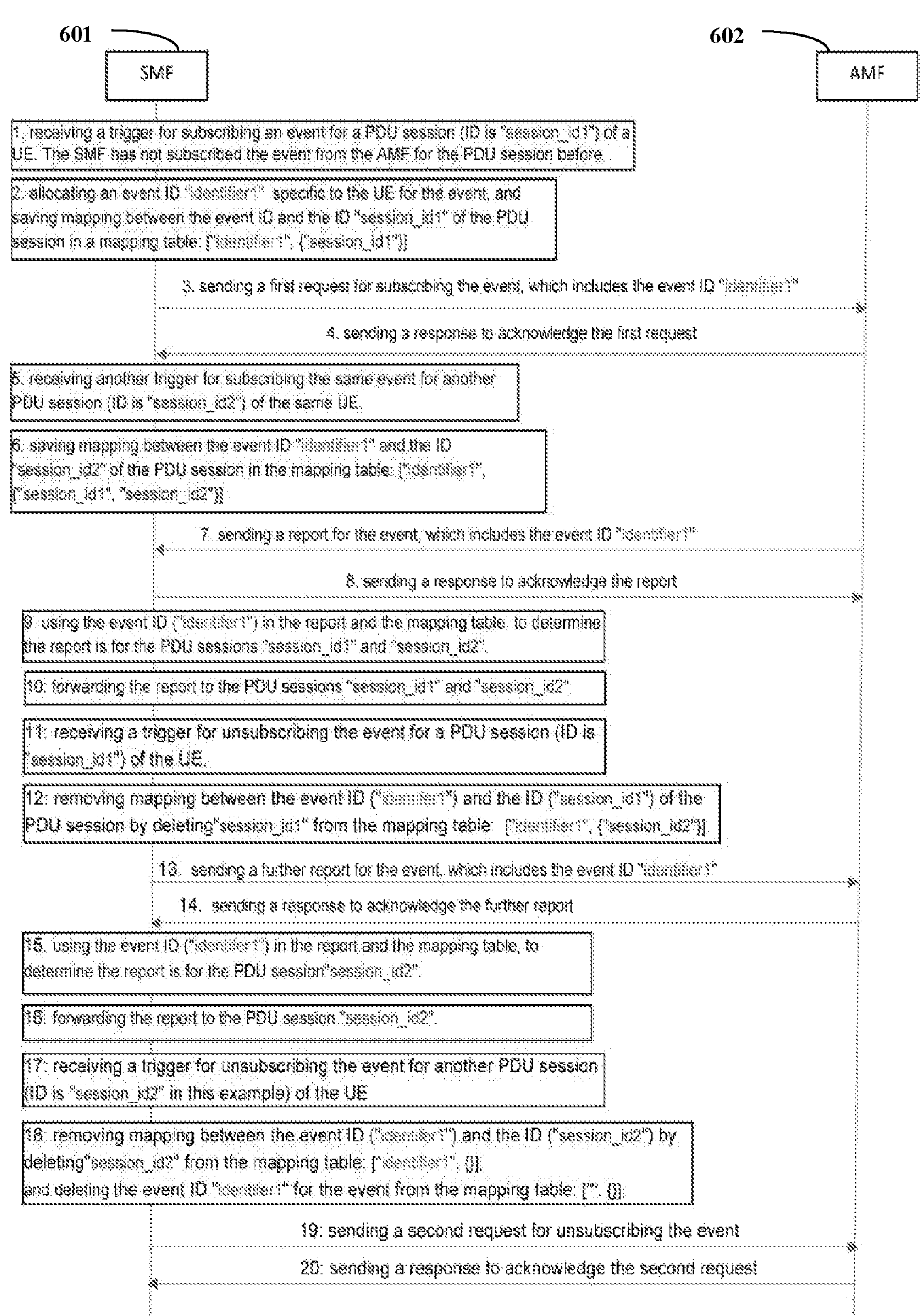
FIG. 6 illustrates example processing and signaling interaction for the first NF and the second NF according to the present disclosure.

Now, further embodiments will be described in connection with a SMF (as the consumer) and an AMF (as the producer) in a 5G network as shown in FIG. 6. It can be understood that, although the further embodiments herein are described in the context of the SMF, the AMF and the 5G network, the embodiments can be also applied to other NFs and/or other mobile communication networks, if the same problem exists in their mechanisms for requesting subscription for multiple sessions of one UE. It will be also understood that, although specific terms are used in the embodiments, the embodiments are not limited to those specific terms but may be applied to all similar entities. For example, the "User Equipment"/"UE" herein may refer to e.g. user terminal, station, terminal, terminal node, and so on.

FIG. 6 illustrates example processing and signaling interaction for the first NF and the second NF according to the present disclosure, wherein the SMF (601) is an example of the first NF, and the AMF (602) is an example of the second NF. It is noted that, although only two PDU sessions are used as example in FIG. 6, it does not mean at most two PDU sessions may be involved in the invention. The invention may involve more PDU sessions, and the maximum number of the PDU sessions of a UE depends on e.g. the following 3GPP limitations: (1) the maximum number of PDU sessions of one UE defined by 3GPP; (2) the number of PDU sessions of one UE simultaneously connecting to the same SMF.

I. An Event is Subscribed for a PDU Session of a UE for the First Time.

Step 1: The SMF, which is a consumer of an Event Exposure service, receives a trigger for subscribing an event for a PDU session (whose ID is "session_id1" in this example) of a UE. The trigger may come from the SMF itself or another NF, according to the traffic requirements, the operator's requirements and/or other requirements specified by the technical specifications of the mobile communication network.

Step 2: The SMF determines whether the event has been allocated an event ID or not currently. In this example, the event is to be subscribed for the first time. Hence, the SMF finds that the event has not been allocated an event ID currently, and the SMF then allocates an event ID ("identifier1" in this example) specific to the UE for the event, and save mapping between the event ID and the ID of the PDU session, e.g., in a mapping table. Each ID of the PDU session uniquely identifies one session of the same UE in the same consumer or one session of the same UE, for example, the 3GPP defined PDU Session ID or any privately defined identifier. It can be understood that, the mapping can be saved in a data structure different than a mapping table. Anyway, as seen from FIG. 6, the mapping table stores the mapping between 'identifier1" and "session_id1".

Step 3: The SMF sends a first request for subscribing the event to the AMF, which is a producer of the Event Exposure service, wherein the first request includes the event ID. In this example, the first request may be a Namf_EventExposure_Subscribe request. In a further embodiment, the event ID is carried in the existing "refId" field or a newly defined field in the Namf_EventExposure_Subscribe request.

It is noted that, although saving mapping between the event ID and the ID of the PDU session is performed before sending the first request in the example of FIG. 6, saving the mapping may also be performed after sending the first request. The sequence of said saving and said sending does not affect the technical effect of the invention.

Step 4: The AMF may acknowledge the first request by sending a response to the SMF, and the event ID may be contained or may not be contained in the response. In this example, the response may be a Namf_EventExposure_Subscribe response. It is possible that there is no such a response, when the invention is applied in another mobile communication network.

II. The Same Event is Subscribed for Another PDU Session of the Same UE.

Step 5: The SMF receives another trigger for subscribing the same event for another PDU session (whose ID is "session_id2" in this example) of the same UE.

Step 6: The SMF finds that the event has been allocated an event ID, that is to say, the SMF has subscribed the same event from the AMF for this UE before. Hence, the SMF simply save mapping between the event ID and the ID of the PDU session, e.g., in a mapping table, without needing to send another request for subscribing the event to the AMF, so the signalling can be saved. As described above, the mapping can be saved in a data structure different than a mapping table. Anyway, as seen from FIG. 6, the mapping table now stores the mapping between "identifier1" and {"session_id1", "session_id2"}.

III. The AMF Sends a Report for the Event to the SMF.

Step 7: The AMF sends a report for the event to the SMF, if the event occurs. In the report, the event ID ("identifer1" in this example) is contained in the report. In this example, the report may be carried in a Namf_EventExposure_Notify request. In a further embodiment, the event ID is carried in the existing "refId" field or a newly defined field in the report.

It can be understood that, since an event ID is specific to a UE according to the present disclosure, there may be multiple event IDs in the report, if more than one event IDs had previously been allocated to the event for PDU sessions from multiple UEs.

Step 8: The SMF may acknowledge the report by sending a response to the AMF. In this example, the response may be a Namf_EventExposure_Notify response. It is possible that there is no such a response, when the invention is applied in another mobile communication network.

IV. The SMF Forwards the Report for the Event to the Corresponding PDU Session(s).

Step 9: The SMF uses the event ID ("identifer1" in this example) in the report received from the AMF and the local mapping table, to determine the PDU session(s) the report is for. In this example, this report including the event ID "identifer1" is for the PDU session whose ID is "session_id1" and the PDU session whose ID is "sesson_id2", according to the mapping table.

If there are multiple event IDs in the report, the SMF will use each event ID and a corresponding mapping table to determine which PDU session(s) the report is for.

Step 10: The SMF forwards the report to the corresponding PDU session(s). In this example, the report is forwarded to the PDU session whose ID is "session_id1" and the PDU session whose ID is "sesson_id2".

Compared to subscription per session, there is only one report for the event for multiple PDU sessions of one UE from the AMF, thus the signalling can be saved. If M PDU sessions share the same event subscription, the signalling overhead of the report can be reduced by (M-1)/M.

V. The Event is Unsubscribed for a PDU Session of the UE.

Step 11: The SMF receives a trigger for unsubscribing the event for a PDU session (whose ID is "session_id1" in this example) of the UE. The trigger may come from the SMF itself or another NF, according to the traffic requirements, the operator's requirements and/or other requirements specified by the technical specifications of the mobile communication network.

Step 12: the SMF removes mapping between the event ID ("identifier1" in this example) and the ID ("session_id1" in this example) of the PDU session for which the event is unsubscribed, by e.g. deleting the ID "session_id1" of the PDU session from the mapping table, thus only mapping between the event ID "identifier1" and the session ID "session_id2" is kept in the mapping table in this example.

Compare to subscription per session, there is no need to send a request for unsubscribing the event to AMF in this situation, thus the signalling overhead for unsubscribing can be reduced.

VI. The AMF Sends a Further Report for the Event to the SMF.

Step 13: The AMF sends a further report for the event to the SMF, if the event occurs again. In the further report, the event ID ("identifer1" in this example) is contained. In this example, the further report may be carried in a Namf_EventExposure_Notify request. In a further embodiment, the event ID is carried in the existing "refId" field or a newly defined field in the further report.

It can be understood that, since an event ID is specific to a UE according to the present disclosure, there may be multiple event IDs in the further report, if more than one event IDs had previously been allocated to the event for PDU sessions from multiple UEs.

Step 14: The SMF may acknowledge the further report by sending a response to the AMF. In this example, the response may be a Namf_EventExposure_Notify response. It is possible that there is no such a response, when the invention is applied in another mobile communication network.

VII. The SMF Forwards the Further Report for the Event to the Corresponding PDU Session(s).

Step 15: The SMF uses the event ID ("identifer1" in this example) in the further report received from the AMF and the local mapping table, to determine the PDU session(s) the further report is for. In this example, this further report including the event ID "identifer1" is only for the PDU session whose ID is "sesson_id2", according to the mapping table.

If there are multiple event IDs in the further report, the SMF will use each event ID and a corresponding mapping table to determine which PDU session(s) the further report is for.

Step 16: The SMF forwards the further report to the corresponding PDU session(s). In this example, the further report is forwarded to only the PDU session whose ID is "session_id2".

VII. The Event is Unsubscribed for Another PDU Session of the UE.

Step 17: The SMF receives a trigger for unsubscribing the event for another PDU session (whose ID is "session_id2" in this example) of the UE. The trigger may come from the SMF itself or another NF, according to the traffic requirements, the operator's requirements and/or other requirements specified by the technical specifications of the mobile communication network.

Step 18: the SMF removes mapping between the event ID ("identifier1" in this example) and the ID ("session_id2" in this example) of the PDU session for which the event is unsubscribed, by e.g. deleting the ID "session_id2" of the PDU session from the mapping table, and then there is no mapping regarding the event ID "identifier1" in the mapping table in this example. If the SMF determines there is no mapping regarding the event ID "identifier1" in the mapping table, the SMF should also delete the event ID ("identifier1" in this example).

Step 19: Since there is no PDU session for which the event needs to be subscribed, the SMF sends a second request for unsubscribing the event to the AMF. The second request may be a Namf_EventExposure_UnSubscribe request in this example.

Step 20: The AMF may acknowledge the second request by sending a response to the AMF. In this example, the response may be a Namf_EventExposure_UnSubscribe response. It is possible that there is no such a response, when the invention is applied in another mobile communication network.

It can be understood that, the second NF should notify a third NF of subscription information of the event which includes the event ID, if the third NF will act as a new producer providing the Event Exposure service. For example, the AMF should notify subscription information of the event which includes the event ID to a new AMF, if the new AMF will act as a new producer providing the Event Exposure service. The third NF (i.e., the new producer) may act similarly as the second NF, for example, the new producer will also save the event ID, and send a report including the event ID for the event to the first NF, if the event occurs.

However, when the first NF is a NF other than a UDM, e.g., when the first NF is a SMF, if the subscription information includes the event ID in the existing "refId" field, and the new AMF and a UDM both support the "ESSYNC" feature, the new AMF may initiate an unnecessary synchronization for event subscriptions with the UDM for the specific UE when the new AMF sees the "refId" field is not empty. To avoid this unnecessary subscription synchronization, the subscription information may further include an indicator for the new AMF to indicate the subscription of the event does not need to be synchronized with a UDM. For example, a new Information Element (IE) "eventSyncInd" may be defined in "AmfEventSubscription" type specified in 3GPP TS 29.518 as the indicator. The value "true" of the IE "eventSyncInd" may mean that the event subscription synchronization with a UDM shall be performed for the subscription, and the absence of the IE "eventSyncInd" or value "false" of the IE "eventSyncInd" may mean the event subscription synchronization with a UDM is not needed for the subscription. Hence, the IE absence of "eventSyncInd" or the IE "eventSyncInd" with the value "false" may be used as the indicator for the new AMF to indicate the subscription of the event does not need to be synchronized with a UDM. In addition, according to some traffic requirements, the new AMF needs to initiate synchronization for event subscriptions with a UDM, when the new AMF and the UDM both support the "ESSYNC" feature and the first NF is the UDM or another UDM, and in this case, the indicator in the subscription information should be set to a value indicating the new AMF to synchronize the subscription of the event with the UDM (e.g., the value of the IE "eventSyncInd" is set to "true"). Anyway, when the third NF is a new AMF, the subscription information may optionally include the indicator to indicate whether said new AMF needs to synchronize the subscription of the event with a UDM.

Figure 7:
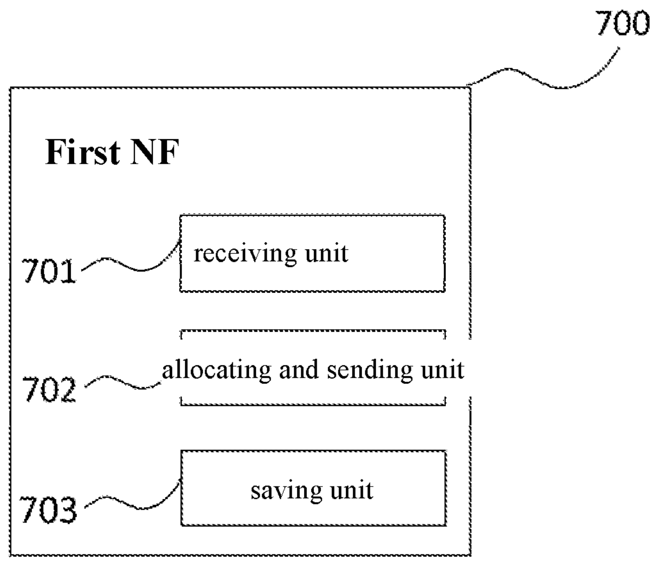
FIG. 7 is a schematic block diagram of a first NF according to the present disclosure.
Figure 8:
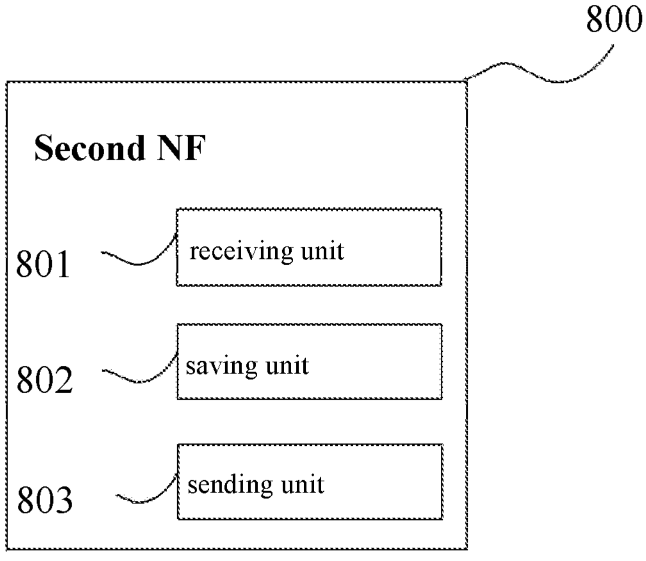
FIG. 8 is a schematic block diagram of a second NF according to the present disclosure.

FIG. 7 illustrates a schematic block diagram of a first NF 700 according to the present disclosure. The first NF 700 implements a consumer of an Event Exposure service provided by a second NF implementing a producer of the Event Exposure service. The first NF 700 may include: a receiving unit 701, for receiving a trigger for subscribing an event for a PDU session of a UE; an allocating and sending unit 702, for allocating an event ID specific to the UE for the event, and sending a first request for subscribing the event to the second NF, if the event has not been allocated the event ID, wherein the first request includes the event ID; and a saving unit 703, for saving mapping between the event ID and the ID of the PDU session FIG. 8 illustrates a schematic block diagram of a second NF 800 according to the present disclosure. The second NF 800 implements a producer providing an Event Exposure service to a first NF implementing a consumer of the Event Exposure service. The second NF 800 may include: a receiving unit 801, for receiving a request for subscribing an event from the first NF, wherein the request includes an event ID of the event; a saving unit 802, for saving the event ID; and a sending unit 803, for sending a report for the event to the first NF, if the event occurs, wherein the report includes the event ID.

It can be appreciated that, the first NF 700 and the second NF 800 described herein may be implemented by various units, so that each of the first NF 700 and the second NF 800 implementing one or more functions described with the embodiments may comprise not only the units shown in the corresponding figure, but also other units for implementing one or more functions thereof. In addition, each of the first NF 700 and the second NF 800 may comprise a single unit configured to perform two or more functions, or separate units for each separate function. Moreover, the units may be implemented in hardware, firmware, software, or any combination thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flow-chart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 9:
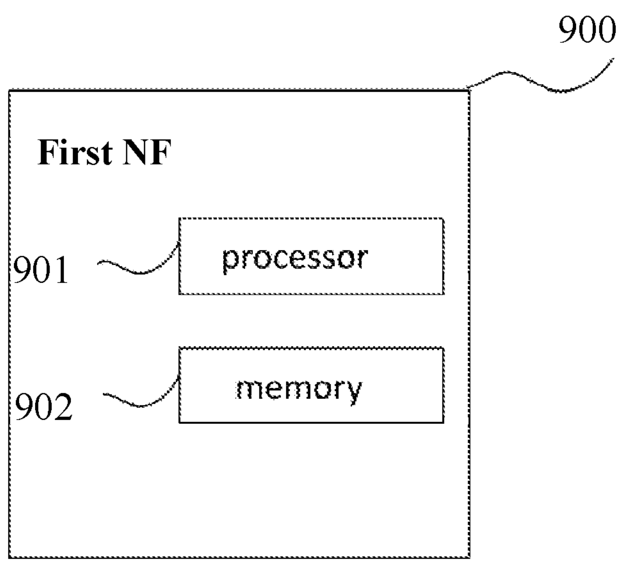
FIG. 9 is another schematic block diagram of a first NF according to the present disclosure.
Figure 10:
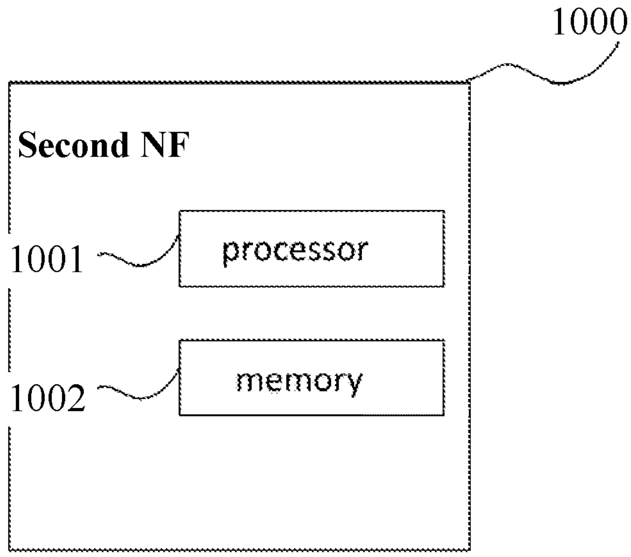
FIG. 10 is another schematic block diagram of a second NF according to the present disclosure.

Therefore, the present disclosure also provides a first NF 900 including a processor 901 and a memory 902, as shown in FIG. 9. In the first NF 900, the memory 902 stores instructions that when executed by the processor 901 cause the first NF 900 to perform the method of the first NF described above with the embodiments. The present disclosure also provides a second NF 1000 including a processor 1001 and a memory 1002, as shown in FIG. 10. In the second NF 1000, the memory 1002 stores instructions that when executed by the processor 1001 cause the second NF 1000 to perform the method of the RU described above with the embodiments.

The present disclosure also provides a machine readable medium (not illustrated) having stored thereon instructions that when executed on a first NF cause the first NF to perform the method of the first NF described with the above embodiments. The present disclosure also provides a machine readable medium (not illustrated) having stored thereon instructions that when executed on a second NF cause the second NF to perform the method of the second NF described with the above embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

In fact, according to the present disclosure, the inventors have proposed some changes in the following contents in 3GPP TS29.518, wherein the changes are shown in bold and underlined text.

"5.3.2.2.2 Creation of a Subscription

The Subscribe service operation is invoked by a NF Service Consumer, e.g. NEF, towards the AMF, when it needs to create a subscription to monitor at least one event relevant to the AMF. The NF Service Consumer may subscribe to multiple events in a subscription. A subscription may be associated with one UE, a group of UEs or any UE.

The NF Service Consumer shall request to create a new subscription by using HTTP method POST with URI of the subscriptions collection, see clause 6.2.3.2.

The NF Service Consumer shall include the following information in the HTTP message body:

- NF ID, indicates the identity of the network function instance initiating the subscription;
- Subscription Target, indicates the target(s) to be monitored, as one of the following types:
  - A specific UE, identified with a SUPI, a PEI or a GPSI;
  - A group of UEs, identified with a group identity;
  - Any UE, identified by the "anyUE" flag.
- Notification URI, indicates the address to deliver the event notifications generated by the subscription;
- Notification Correlation ID, indicates the correlation identity to be carried in the event notifications generated by the subscription;
- List of events to be subscribed;
- Event Types per event, as specified in clause 5.3.1.

The NF Service Consumer may include the following information in the HTTP message body:

- Immediate Report Flag per event, indicates an immediate report to be generated with current event status;
- Event Trigger, indicates how the events shall be reported (One-time Reporting or Continuously Reporting).
- Maximum Number of Reports, defines the maximum number of reports after which the event subscription ceases to exist;
- Expiry, defines maximum duration after which the event subscription ceases to exist;
- Sampling ratio, defines the random subset of UEs among target UEs, and AMF only report the event(s) related to the selected subset of UEs;
- Periodic Report Flag per event, indicates the report to be generated periodically;
- Repetition Period, defines the period for periodic reporting;
- Event Filter per applicable event, defines further options on how the event shall be reported.
- Reference Id per event, indicates the value of the Reference Id associated with the event to be monitored. If provided, the Reference Id shall be included in the reports triggered by the event.

Figure 1:
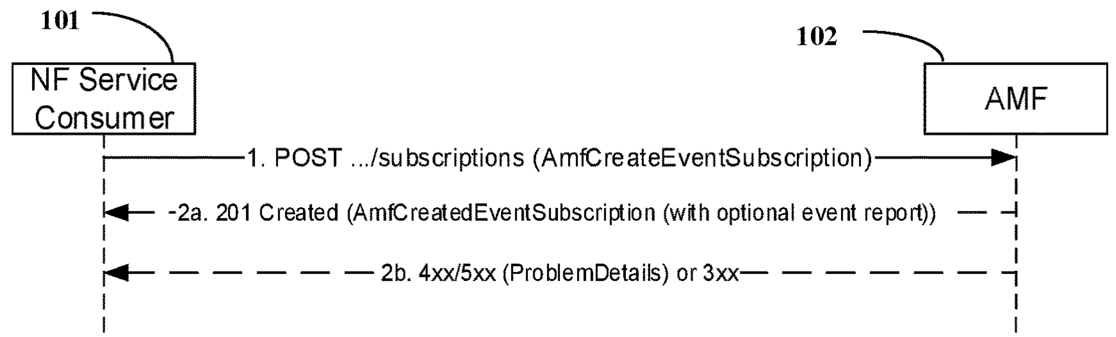
FIG. 1 illustrates an example of the Subscribe operation between the NF Service Consumer and the AMF.
Figure 2:
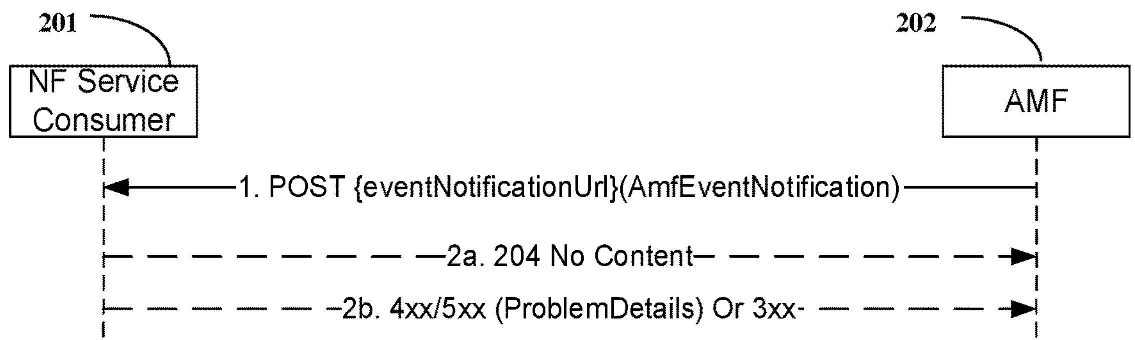
FIG. 2 illustrates an example of the Notify operation between the NF Service Consumer and the AMF.
Figure 3:
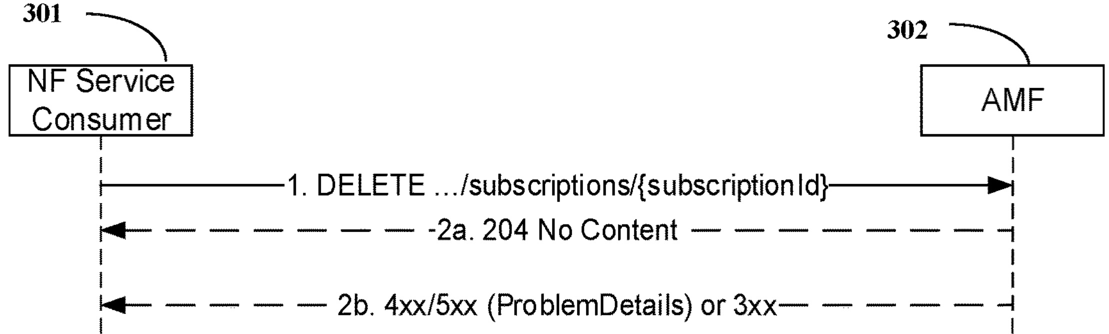
FIG. 3 illustrates an example of the Notify operation between the NF Service Consumer and the AMF.

See FIG. 1

1. The NF Service Consumer shall send a POST request to create a subscription resource in the AMF. The payload body of the POST request shall contain a representation of the individual subscription resource to be created. The request may contain an expiry time, suggested by the NF Service Consumer as a hint, representing the time upto which the subscription is desired to be kept active and the time after which the subscribed event(s) shall stop generating report.

2a. On success, the request is accepted, the AMF shall include a HTTP Location header to provide the location of a newly created resource (subscription) together with the status code 201 indicating the requested resource is created in the response message. If the NF Service Consumer has included more than one events in the event subscription and some of the events are failed to be subscribed, the AMF shall accept the message and provide the successfully subscribed event(s) in AmfEventSubscription. If the NF Service Consumer has included the immediateFlag with value as "true" in the event subscription, the AMF shall include the current status of the events subscribed, if available (e.g. last known location information is included if the subscribed event is LOCATION_REPORT). If the events with immediateFlag set to "true" are subscribed by an NF service consumer on behalf of a third NF and the notification will be sent to the third NF directly, i.e. subsChangeNotifyUri is included in the event subscription, the current status of the events subscribed shall not be included in response. The AMF shall subsequently send a notification to the third NF including the current status of the events subscribed.

If the NF Service Consumer has set the event reporting option as ONE_TIME and if the AMF has included the current status of the events subscribed in the response, then the AMF shall not do any subsequent event notification for the events given in the AmfCreateEventSubscription parameter. If the NF Service Consumer has set the event reporting option as ONE_TIME, the subscribed event as LOCATION_REPORT and the immediateFlag is set to false or absent, the AMF shall send an event notification to notify the current location of the UE after the subscription.

The response, based on operator policy and taking into account the expiry time included in the request, may contain the expiry time, as determined by the AMF, after which the subscription becomes invalid. Once the subscription expires, if the NF Service Consumer wants to keep receiving notifications, it shall create a new subscription in the AMF. The AMF shall not provide the same expiry time for many subscriptions in order to avoid all of them expiring and recreating the subscription at the same time. If the expiry time is not included in the response, the NF Service Consumer shall consider the subscription to be valid without an expiry time.

If the sampling ratio ("sampRatio") attribute is included in the subscription, the AMF shall select a random subset of UEs among target UEs according to the sampling ratio and only report the event(s) related to the selected subset of UEs.

If the AMF and the NF consumer (i.e. UDM) both supports "ESSYNC" feature and the subscription is targeting a specific UE, the AMF shall locally include the "eventSyncInd" IE with value "true" in the created subscription. The "eventSyncInd" IE shall not be included in event subscription sent to the NF consumer. The "eventSyncInd" IE with value "true" shall be included in UE Context during inter-AMF mobility procedures, if new AMF supports "ESSYNC" feature.

2b. On failure or redirection, one of the HTTP status code listed in Table 6.2.3.2.3.1-3 shall be returned. For a 4xx/5xx response, the message body shall contain a ProblemDetails structure with the "cause" attribute set to one of the application error listed in Table 6.2.3.2.3.1-3.

5.3.2.4.2 Event Subscription Synchronization for Specific UE

When the AMF and the UDM both support the "ESSYNC" feature, the AMF may initiate synchronization for event subscriptions with the UDM for the specific UE during EPS to 5GS mobility registration procedure (see clause 4.11.5.2 of 3GPP TS 23.502 [3]), if UE specific event subscriptions from the UDM are available in UE Context.

To initiate event subscription synchronization, when sending notification for subscription change to the UDM, the AMF shall include the event subscription information in the notification request. If subscription change notification is not needed, e.g. when UE registers to the same AMF after moving from EPS, the AMF may send a notification to the subscription change notification URI. The notification request in this case only includes the event subscription information but no event report list.

The AMF shall only include active event subscriptions that are subject to Event Subscription Synchronization with UDM (determined as defined in clause 5.3.2.2.2) in the event subscription information.

For each active subscription, the following information shall include:

URI of the subscription resource in the AMF; and

Notification Correlation Id of the subscription; and list of Reference Ids, one per event in the subscription; and optionally, the URI of old subscription resource on the source AMF, if the subscription Id is changed during the mobility procedure.

When the UDM receives event subscription information from AMF, the UDM shall compare the active event subscriptions in AMF with the active UDM Event Exposure subscriptions using Reference Id(s) and Notification Correlation Id, and perform the following:

if an event is to be detected by AMF but not existing in the AMF, the UDM shall subscribe the event in AMF by creating a new AMF event subscription or updating an existing AMF event subscription;

if an event exists in AMF but does not exist in UDM, the UDM shall unsubscribe the event from AMF by removing or update an AMF event subscription.

6.2.6.2.2 Type: AmfEventSubscription

TABLE 6.2.6.2.2-1

| Definition of type AmfEventSubscription | | | | | |
|---|---|---|---|---|---|
| Attribute name | Data type | P | Cardinality | Description | Applicability |
| eventList | array (AmfEvent) | M | 1 . . . N | Describes the events to be subscribed in subscription request or the events successfully subscribed for this subscription in subscription response. | |
| eventNotifyUri | Uri | M | 1 | Identifies the recipient of notifications sent by AMF for this subscription (NOTE 1) | |
| notifyCorrelationId | string | M | 1 | Identifies the notification correlation ID. The AMF shall include this ID in the notifications. The value of this IE shall be unique per subscription for a given NF service consumer. | |

TABLE 6.2.6.2.2-1-continued

Definition of type AmfEventSubscription

| Attribute name | Data type | P | Cardi-nality | Description | Appli-cability |
|---|---|---|---|---|---|
| nfId | NfInstanceId | M | 1 | Indicates the instance identity of the network function creating the subscription. | |
| subsChangeNotifyUri | Uri | C | 0 . . . 1 | This IE shall be present if the subscription is created by an NF service consumer on behalf of another NF (e.g UDM creating event subscription at AMF for event notifications towards NEF). When present, this IE Identifies the recipient of notifications sent by AMF, for the creation of a new subscription ID, that is considered as a change of subscription ID by the NF service consumer for event subscriptions related to single UE or as the creation of a new subscription Id for event subscriptions related to UE groups (e.g during mobility procedures involving AMF change). (NOTE 3). | |
| subsChangeNotify-CorelationId | string | C | 0 . . . 1 | This IE shall be present when an NF Service Consumer (e.g. UDM) is subscribing for events on behalf of another NF Service Consumer (e.g. NEF). When present, this IE shall contain the notification correlation ID. The AMF shall include it in the notifications for the creation of a new subcription ID that is considered as a change of subscription ID by the NF service consumer for event subscriptions related to single UE or as the creation of a new subscription Id for event subscriptions related to UE groups.<br>The value of this IE shall be unique per subscription for a given NF service consumer that is sending this IE.<br>(NOTE 3) . . . | |
| supi | Supi | C | 0 . . . 1 | Subscription Permanent Identifier (NOTE 2) | |
| groupId | GroupId | C | 0 . . . 1 | Identifies a group of UEs. (NOTE 2) | |
| gpsi | Gpsi | C | 0 . . . 1 | Generic Public Subscription Identifier (NOTE 2) | |
| pei | Pei | C | 0 . . . 1 | Permanent Equipment Identifier (NOTE 2) | |
| anyUE | boolean | C | 0 . . . 1 | This IE shall be present if the event subscription is applicable to any UE. Default value “FALSE” is used, if not present (NOTE 2) | |
| options | AmfEvent-Mode | O | 0 . . . 1 | This IE may be included if the NF service consumer wants to describe how the reports of the event have to be generated. The absence of this IE, when creating an AMF event subscription or when transferring the UE context to another AMF, shall be interpreted as a “ONE_TIME” AMF event trigger. | |
| sourceNfType | NFType | C | 0 . . . 1 | This IE should be present for a subscription that is created by an “intermediate NF” (e.g. UDM) on behalf of a “source NF” (e.g. NEF). When present, it shall contain the NF type of the “source NF”. | |
| eventSyncInd | boolean | O | 0 . . . 1 | This IE should be present with value “true” when the event subscription shall be synchronized with UDM during EPS to 5GS mobility registration procedure, as specified in clause 5.3.2.4.2.<br>When present, this IE shall be set as following:<br>true: the event subscription synchronized with UDM shall be performed for the subscription.<br>false: the event subscription synchronized with UDM is not needed for the subscription.<br>This IE shall not be included in event subscription representation sent to the NF consumer. | ESSYNC |

(NOTE 1):

When an NF Service Consumer subscribes on behalf of another NF, the Notification URI identifies a resource under the authority of the other NF.

(NOTE 2):

Either information about a single UE (i.e. SUPI, GPSI, PEI) or groupId, or anyUE set to “TRUE” shall be included.

(NOTE 3):

Same values of “subsChangeNotifyUri” and “subsChangeNotifyCorrelationId” shall be provided by an NF service consumer to all the serving AMF if the subscriptions apply to a group and triggered by one subscription from another NF. This allows the NF service consumer to associate the subscription Id creation notifications received from different serving AMFs to the same group Id subscription, 6.2.8 Feature Negotiation The feature negotiation mechanism specified in clause 6.6 of 3GPP TS 29.500 [4] shall be used to negotiate the optional features applicable between the AMF and the NF Service Consumer, for the Namf_EventExposure service, if any.

The NF Service Consumer shall indicate the optional features it supports for the Namf_EventExposure service, if any, by including the supportedFeatures attribute in payload of the HTTP Request Message for subscription resource creation.

The AMF shall determine the supported features for the service operations as specified in clause 6.6 of 3GPP TS 29.500 [4] and shall indicate the supported features by including the supportedFeatures attribute in payload of the HTTP response for subscription resource creation.

The syntax of the supportedFeatures attribute is defined in clause 5.2.2 of 3GPP TS 29.571 [6].

The following features are defined for the Namf_EventExposure service:

TABLE 6.2.8-1

Features of supportedFeatures attribute used by Namf_EventExposure service

| Feature Number | Feature | M/O | Description |
|---|---|---|---|
| 1 | ENA | O | Enablers for Network Automation for 5G<br>An AMF and an NF that support this feature shall support the procedures specified in 3GPP TS 23.288 [38]. |
| 2 | APRA | O | Additional Presence Reporting Area<br>An AMF that supports this feature shall support subscription of "PRESENCE_IN_AOI_REPORT" event with a Set of Core Network Predefined Presence Reporting Areas and generating event report including both PRA Set ID and additional PRA ID referring to an individual PRA in the Set.<br>An NF service consumer that supports this feature shall support receiving "PRESENCE_IN_AOI_REPORT" event with additional PRA ID referring to an individual PRA in the Set. |
| 3 | ESSYNC | O | Event Subscription Synchronization<br>An AMF and UDM that supports this feature shall support the event subscription synchronization procedure, as specified in clause 5.3.2.4.2.<br>The AMFs support this feature shall support identifying the event subscriptions to be synchronized, i.e. the event subscriptions are targeting a specific UE and created by UDM, and handling the event subscription synchronization indication in UE Context. |
| 4 | ES3XX | M | Extended Support of HTTP 307/308 redirection<br>An NF Service Consumer (e.g. NEF) that supports this feature shall support handling of HTTP 307/308 redirection for any service operation of the Namf_EventExposure service. An NF Service Consumer that does not support this feature does only support HTTP redirection as specified for 3GPP Release 15. |

Feature number: The order number of the feature within the supportedFeatures attribute (starting with 1).

Feature: A short name that can be used to refer to the bit and to the feature.

M/O: Defines if the implementation of the feature is mandatory ("M") or optional ("O").

Description: A clear textual description of the feature.

A.3 Namf_EventExposure API

************** Text Skipped for Clarity **************

```
AmfEventSubscription:
  type: object
  properties:
    eventList:
      type: array
      items:
      $ref: '#/components/schemas/AmfEvent'
      minItems: 1
    eventNotifyUri:
      $ref:
'TS29571_CommonData.yaml#/components/schemas/Uri'
    notifyCorrelationId:
      type: string
    nfId:
      $ref:
'TS29571_CommonData.yaml#/components/schemas/NfInstanceId'
    subsChangeNotifyUri:
      $ref:
'TS29571_CommonData.yaml#/components/schemas/Uri'
    subsChangeNotifyCorrelationId:
      type: string
    supi:
      $ref:
'TS29571_CommonData.yaml#/components/schemas/Supi'
    groupId:
      $ref:
'TS29571_CommonData.yaml#/components/schemas/GroupId'
    gpsi:
      $ref:
'TS29571_CommonData.yaml#/components/schemas/Gpsi'
    pei:
      $ref:
'TS29571_CommonData.yaml#/components/schemas/Pei'
    anyUE:
      type: boolean
    options:
      $ref: '#/components/schemas/AmfEventMode'
    sourceNfType:
      $ref:
'TS29510_Nnrf_NFManagement.yaml#/components/schemas/NFType'
    eventSyncInd:
      type: boolean
  required:
    - eventList
    - eventNotifyUri
    - notifyCorrelationId
    - nfId
```

6.2.6.2.3 Type: AmfEvent

TABLE 6.2.6.2.3-1

Definition of type AmfEvent

| Attribute name | Data type | P | Cardi-nality | Description | Appli-cability |
|---|---|---|---|---|---|
| type | AmfEventType | M | 1 | Describes the AMF event type to be reported | |
| immediateFlag | boolean | O | 0 . . . 1 | Indicates if an immediate event report in the subscription response is requested. The report contains the current value/status of the event stored at the time of the subscription in the AMF (NOTE 1). If the flag is not present then immediate reporting shall not be done. | |
| areaList | array (AmfEventArea) | O | 1 . . . N | Identifies the area to be applied. More than one instance of AmfEventArea IE shall be used only when the AmfEventArea is provided during event subscription for Presence Reporting Area subscription. | |
| locationFilterList | array (LocationFilter) | O | 1 . . . N | Describes the filters to be applied for LOCATION_REPORT event type. If this attribute is not present in the request, it indicates the change of the TA used by the UE should be reported. | |
| refId | ReferenceId | O | 0 . . . 1 | Indicates the Reference Id associated with the event. (NOTE 3) (NOTE 4) | |
| trafficDescriptorList | array (TrafficDescriptor) | O | 1 . . . N | Indicates the filters to be applied for AVAILABILITY_AFTER_DDN_FAILURE event type. | |
| reportUeReachable | boolean | C | 0 . . . 1 | This IE shall be present and set to value "true" by the source AMF to request the target AMF to notify the subscriber when UE becomes reachable, during inter-AMF mobility procedures.<br>When present, this IE shall be set as following:<br>true: target AMF shall notify the subscriber when UE becomes reachable<br>false (default): target AMF shall not notify the subscriber when UE becomes reachable, until next reporting trigger is detected, i.e. DDN failure detected (for AVAILABILITY_AFTER_DDN_FAILURE event) or UE becomes unreachable for downlink traffic (for "UE Reachable for DL Traffic" of REACHABILITY_REPORT event)<br>This IE only applies to following Event Types:<br>AVAILABILITY_AFTER_DDN_FAILURE<br>REACHABILITY_REPORT (for "UE Reachable for DL Traffic") | |
| reachabilityFilter | ReachabilityFilter | O | 0 . . . 1 | When present, this IE shall indicate the filter to be applied for the REACHABILITY_REPORT event type.<br>If the subscription of REACHABILITY_REPORT is for "UE Reachability Status Change", the AMF shall report current reachability state and subsequent updated reachability state of the UE, when AMF becomes aware of a UE reachability state change between REACHABLE, UNREACHABLE and REGULATORY_ONLY.<br>If the subscription of REACHABILITY_REPORT is for "UE Reachable for DL Traffic", the AMF shall report the "REACHABLE" state, when the UE transitions to CM-CONNECTED mode or when the UE will become reachable for paging, as specified in table 4.15.3.1-1, clauses 4.2.5 and 4.3.3 of 3GPP TS 23.502 [3].<br>If this IE is absent, the subscription of REACHABILITY_REPORT is for "UE Reachability Status Change". | |

TABLE 6.2.6.2.3-1-continued

Definition of type AmfEvent

| Attribute name | Data type | P | Cardi-nality | Description | Appli-cability |
|---|---|---|---|---|---|
| udmDetectInd | boolean | O | 0 . . . 1 | The IE may be present for subscription for "UE Reachable for DL Traffic". When present, this IE shall indicate whether the UE Reachability Event will be detected at UDM (i.e. with Nudm_UECM_Registration) or not: true: UE Reachability will be detected at UDM false (default) UE Reachability will not be detected at UDM | |
| maxReports | integer | O | 0 . . . 1 | This IE may be present if the trigger is set to "CONTINUOUS" or "PERIODIC". When present, this IE describes the maximum number of reports that can be generated by the subscribed event. If the AMF event subscription is for a group of UEs, this parameter shall be applied to each individual member UE of the group. If the event subscription is transferred from source AMF to a target AMF, this IE shall contain: the remaining number of reports for the event subscription, in the case of individual UE event subscription; or the remaining number of reports for the event subscription for this specific UE, in the case of a group event subscription. If the group subscription has not expired and all reports have been sent already for this event, the remaining number of reports shall be set to "0". (NOTE 2) | |
| presenceInfoList | map (PresenceInfo) | O | 1 . . . N | Map of PRA Information, the "praId" attribute within the PresenceInfo data type shall also be the key of the map. The "presenceState" attribute within the PresenceInfo data type shall not be supplied. When present, the areaList shall be absent. | MPRA |
| maxResponseTime | DurationSec | C | 0 . . . 1 | This IE shall be present, when the UDM subscribes to "REACHABILITY_REPORT" event for "UE Reachable for DL Traffic" on behalf of the AF and the AF sets the Maximum Response Time in the Monitoring Configuration. When present, this IE shall indicate the Maximum Response Time configured by the AF. | |
| targetArea | TargetArea | C | 0 . . . 1 | The IE shall be present for subscription for SNSSAI_TA_MAPPING_REPORT event type. When present, this IE shall indicate the TAI list to be applied. | |
| snssaiFilter | array (ExtSnssai) | O | 1 . . . N | The IE may be present for subscription for SNSSAI_TA_MAPPING_REPORT event type. When present, this IE shall indicate the S-NSSAI list to be applied. | |

(NOTE 1):

The current value of the location is the last known location if the immediate report filter request to provide the 3GPP location information down to the Cell-ID or the TAI. An NF Service Consumer willing to only receive the current location shall not set the immediateFlag to true when subscribing to a location event report.

(NOTE 2):

When creating an AMF event subscription with multiple events, the same maximum number of reports shall apply to each event. Accordingly, maxReports in this attribute should not be present when creating an AMF event subscription; if it is present, it shall contain the same value for all events and maxReports in the AmfEventMode shall have precedence over the maxReports in this attribute. maxReports in this attribute and maxReports in the AmfEventMode have different semantics when transferring the event subscription from a source AMF to a target AMF.

(NOTE 3):

Each Monitoring Configuration subscribed via UDM Event Exposure service uses a Reference Id as the key. This IE shall carry the Reference Id when UDM subscribes to the AMF event for the corresponding Monitoring Configuration.

(NOTE 4):

The SMF can use it to associate the pdu session(s) which subscribe(s) the event with the amfEventType or different amfEventType.

6.2.6.2.5 Type: AmfEventReport

TABLE 6.2.6.2.5-1

Definition of type AmfEventReport

| Attribute name | Data type | P | Cardinality | Description | Appli-cability |
|---|---|---|---|---|---|
| type | AmfEvent-Type | M | 1 | Describes the type of the event which triggers the report | |
| state | AmfEvent-State | M | | Describes the state of the event which triggered the report. This IE shall be set to "TRUE" when subscriptionId IE is present. | |
| timeStamp | DateTime | M | 1 | This IE shall contain the time at which the event is generated. | |
| subscriptionId | Uri | C | 0 . . . 1 | This IE shall be included when the event notification is for informing the creation of a subscription Id at the AMF during mobility of a UE across AMFs.<br>When present, this IE shall contain the URI of the created subscription resource at the AMF; this shall contain an absolute URI set to the Resource URI specified in clause 6.2.3.3.2.<br>The type IE shall be set to:<br>SUBSCRIPTION_ID_CHANGE, when the AMFcreates a subscription Id for a UE specific event subscription during mobility registration and handover procedures involving an AMF change.<br>SUBSCRIPTION_ID_ADDITION, when the AMF creates a subscription Id for a group Id specific event subscription during mobility registration and handover procedures involving an AMF change. | |
| anyUe | boolean | C | 0 . . . 1 | This IE shall be included and shall be set to "true", if the event subscription is a bulk subscription for number of UEs and the event reported is for one of those UEs. | |
| supi | Supi | C | 0 . . . 1 | This IE shall be present if available.<br>When present, this IE identifies the SUPI of the UE associated with the report (NOTE). | |
| areaList | array (Amf-EventArea) | C | 1 . . . N | This IE shall be present when the AMF event type is "PRESENCE_IN_AOI_REPORT".<br>When present, this IE represents the specified Area(s) of Interest the UE is currently IN/OUT/UNKNOWN.<br>If the AMF event is subscribed towards a PRA identifier referring to a Set of Core Network predefined Presence Reporting Areas, the AMF shall report both the subscribed PRA Identifier and the additional PRA identifier of the actually individual PRA(s) where the UE is currently IN/OUT, as specified in clause 5.6.11 of 3GPP TS 23.501 [2]. | |
| refId | ReferenceId | C | 0 . . . 1 | This IE shall be present if a Reference Id has previously been associated with the event triggering the report.<br>When present, this IE shall indicate the Reference Id associated with the event which triggers the report. | |
| gpsi | Gpsi | C | 0 . . . 1 | This IE shall be present if available.<br>When present, this IE identifies the GPSI of the UE associated with the report (NOTE). | |
| pei | Pei | O | 0 . . . 1 | This IE may be included if the event reported is for a particular UE or any UE. This IE identifies the PEI of the UE associated with the report (NOTE). | |
| location | UserLocation | O | 0 . . . 1 | Represents the location information of the UE This IE shall convey exactly one of the following:<br>E-UTRA user location<br>NR user location<br>Non-3GPP access user location.<br>If the additionalLocation IE is present, this IE shall contain either an E-UTRA user location or NR user location. | |
| additionalLocation | UserLocation | O | 0 . . . 1 | This IE shall be present if the "location IE" is present and the AMF reports both a 3GPP user location and a non-3GPP access user location. | |

TABLE 6.2.6.2.5-1-continued

Definition of type AmfEventReport

| Attribute name | Data type | P | Cardinality | Description | Applicability |
|---|---|---|---|---|---|
| | | | | When present, this IE shall convey the non-3GPP access user location. | |
| timezone | TimeZone | O | 0 . . . 1 | Describes the time zone of the UE | |
| accessTypeList | array (AccessType) | O | 1 . . . N | Describes the access type(s) of the UE. When reporting that the UE is reachable for DL traffic, this IE shall indicate the access type(s) through which the UE is reachable. This attribute shall be absent if the AMF event type is "SNSSAI_TA_MAPPING_REPORT". | |
| rmInfoList | array (RmInfo) | O | 1 . . . N | Describes the registration management state of the UE | |
| cmInfoList | array (CmInfo) | O | 1 . . . N | Describes the connection management state of the UE | |
| reachability | UeReach-ability | O | 0 . . . 1 | Describes the reachability of the UE | |
| commFailure | Communi-cationFailure | O | 0 . . . 1 | Describes a communication failure for the UE. | |
| numberOfUes | integer | O | 0 . . . 1 | Represents the number of UEs in the specified area | |
| 5gsUserStateList | array(5Gs-UserStateInfo) | O | 1 . . . N | Represents the 5GS User State of the UE per access type | |
| typeCode | string | C | 0 . . . 1 | This IE shall be present when the AMF event type is "TYPE_ALLOCATION_CODE_REPORT". When present, this IE represents the Type Allocation code (TAC), to indicate terminal model and vendor information of the UE. Pattern: '^imeitac-[0-9]{8}$'. | ENA |
| registrationNumber | integer | C | 0 . . . 1 | This IE shall be present when the AMF event type is "FREQUENT_MOBILITY_REGI-STRATION_REPORT". When present, this IE represents the number of the mobility registration procedures included in the event subscription request. during a period identified by the expiry time included in the event subscription request. | ENA |
| ueIdExtList | array (UEIdExt) | C | 1 . . . N | This IE shall be present if multiple SUPIs and/or GPSIs need to be included, the AMF event type is "UES_IN_AREA_REPORT" and the subscribing NF indicated support of the ENA feature. This attribute provides additional SUPIs and/or GPSIs to the supi attribute or gpsi attribute. The ueldExt attribute may be present even if both the supi and gpsi attributes are absent. | ENA |
| lossOfConnect-Reason | LossOf-Connectivity-Reason | O | 0 . . . 1 | Describes the reason for loss of connectivity. This IE should be present when the AMF event type is "LOSS_OF_CONNECTIVITY". | |
| maxAvailability-Time | DateTime | O | 0 . . . 1 | Indicates the time (in UTC) until which the UE is expected to be reachable. This IE may be present in REACHABILITY_REPORT event report for "UE Reachable_for DL Traffic". This information may be used by the SMS Service Center to prioritize the retransmission of pending Mobile Terminated Short Message to UEs using a power saving mechanism (eDRX, PSM etc.). | |
| snssaiTaiList | array(Snssai-TaiMapping) | C | 1 . . . N | This IE shall be present when the AMF event type is "SNSSAI_TA_MAPPING_REPORT". When present, this IE represents the list of restricted or unrestricted S-NSSAIs per PLMN of the TAI(s). | |
| otherRefId | array (ReferenceId) | C | 1 . . . N | This IE shall be present if more than one Reference Id has previously been associated with the event triggering the report. When present, this IE shall indicate the Reference Id associated with the event which triggers the report. | |

NOTE:

If the event report corresponds to an event subscription of a single UE, then the same UE identifier (i.e. SUPI and/or GPSI and/or PEI) received during subscription creation shall be included in the report. If the event report corresponds to an event subscription for group of UEs or any UE, then the SUPI and if available the GPSI shall be included in the event report. SUPI, PEI and GPSI shall not be present in report for UES_IN_AREA REPORT event type.

What is claimed is:

1. A method for a first Network Function (NF) implementing a consumer of an Event Exposure service provided by a second NF implementing a producer of the Event Exposure service, including:

receiving a trigger for subscribing an event for a Protocol Data Unit (PDU) session of a User Equipment (UE);

allocating an event identifier (ID) specific to the UE for the event, and sending a first request for subscribing the event to the second NF, if the event has not been allocated the event ID, wherein the first request includes the event ID; and saving mapping between the event ID and the ID of the PDU session.

2. The method of claim 1, further including:

receiving a report for the event from the second NF, wherein the report includes the event ID;

forwarding the report to one or more PDU sessions of the UE subscribing the event according to mapping between the event ID and the ID(s) of the one or more PDU sessions.

3. The method of claim 1, further including:

receiving a trigger for unsubscribing the event for a PDU session of the UE;

removing mapping between the event ID and the ID of the PDU session for which the event is unsubscribed; and deleting the event ID and sending a second request for unsubscribing the event to the second NF, if there is no mapping between the event ID and an ID of a PDU session in the first NF.

4. The method of claim 1, wherein the mapping is saved in a mapping table in the first NF.

5. The method of claim 1, wherein the first NF is a Session Management Function (SMF) or a Unified Data Management (UDM), and the second NF is an Access and Mobility Management Function (AMF).

6. The method of claim 5, wherein the first request is a Namf_EventExposure_Subscribe request, the report is carried in a Namf_EventExposure_Notify request, and the second request is a Namf_EventExposure_UnSubscribe request.

7. The method of claim 6, wherein the event ID is carried in the existing "refId" field or a newly defined field in the Namf_EventExposure_Subscribe request and in the report.

8. A method for a second Network Function (NF) implementing a producer providing an Event Exposure service to a first NF implementing a consumer of the Event Exposure service, including:

receiving a request for subscribing an event from the first NF;

sending a report for the event to the first NF, if the event occurs; and notifying a third NF of subscription information of the event, if the third NF will act as a new producer providing the Event Exposure service, wherein the first NF is a Session Management Function (SMF) or a first UDM, the second NF is an Access and Mobility Management Function (AMF), and the third NF is another AMF, the subscription information further includes an indicator to indicate whether said another AMF needs to synchronize the subscription of the event with a second UDM, if said another AMF and the second UDM both support the "ESSYNC" feature, wherein the second UDM is the first UDM or another UDM.

9. The method of claim 8, wherein a first value of the indicator indicates said another AMF does not need to synchronize the subscription of the event with the second UDM;

a second value of the indicator indicates said another AMF needs to synchronize the subscription of the event with the second UDM.

10. The method of claim 9, wherein when the first NF is the SMF, the subscription information includes the indicator with the first value.

11. The method of claim 9, wherein when the first NF is the first UDM, the subscription information includes the indicator with the second value.

12. The method of claim 9, wherein the indicator is an "eventSyncInd" Information Element (IE).

13. The method of claim 9, wherein the first value is "false", and the second value is "true".

14. A first Network Function (NF), implementing a consumer of an Event Exposure service provided by a second NF implementing a producer of the Event Exposure service, the first NF including:

a processor; and a memory, having stored instructions that when executed by the processor cause the first NF to:

receive a trigger for subscribing an event for a Protocol Data Unit (PDU) session of a User Equipment (UE);

allocate an event identifier (ID) specific to the UE for the event, and sending a first request for subscribing the event to the second NF, if the event has not been allocated the event ID, wherein the first request includes the event ID; and save mapping between the event ID and the ID of the PDU session.

* * * * *